(12) United States Patent
Descheemaeker et al.

(10) Patent No.: US 10,627,630 B2
(45) Date of Patent: Apr. 21, 2020

(54) DISPLAY SYSTEM AND METHOD FOR AN AIRCRAFT

(71) Applicant: Airbus Operations SAS, Toulouse (FR)

(72) Inventors: Cedric Descheemaeker, Beauzelle (FR); Javier Manjon Sanchez, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 16/016,918

(22) Filed: Jun. 25, 2018

(65) Prior Publication Data

US 2019/0004318 A1 Jan. 3, 2019

(30) Foreign Application Priority Data

Jun. 29, 2017 (FR) ..................................... 17 56020

(51) Int. Cl.
*G02B 27/01* (2006.01)
*B64D 43/00* (2006.01)
(Continued)

(52) U.S. Cl.
CPC ......... *G02B 27/0172* (2013.01); *B64D 43/00* (2013.01); *B64D 45/00* (2013.01);
(Continued)

(58) Field of Classification Search
CPC ............ G02B 27/0172; G02B 27/0093; G02B 2027/0183; G02B 2027/0178;
(Continued)

(56) References Cited

U.S. PATENT DOCUMENTS 6,405,975 B1 * 6/2002 Sankrithi ............... B64D 47/08
244/1 R
6,847,336 B1 1/2005 Lemelson et al.
(Continued)

FOREIGN PATENT DOCUMENTS

EP 2793070 10/2014

OTHER PUBLICATIONS

French Search Report, dated Feb. 16, 2018, priority document.

*Primary Examiner* — Jose R Soto Lopez
(74) *Attorney, Agent, or Firm* — Greer, Burns & Crain Ltd.

(57) ABSTRACT

The display system for an aircraft cockpit comprises a display computer configured to control the display, on a display device worn rigidly attached to a user's head, according to a first display mode comprising at least one piece of flight assistance information for the aircraft, and a masking device, associated with a cockpit side window, controllable between a transparent and opaque states. The display system comprises an extended display mode, in which the display computer is configured to determine whether a direction corresponding to the user's head orientation has an intersection with a region of interest of the side window, in the absence of an intersection, controlling the display according to the first display mode, and when there is an intersection, controlling the masking device opaque state and controlling the display according to a second display mode comprising a virtual display screen on a side window display area.

7 Claims, 4 Drawing Sheets

(51) Int. Cl.
*G02B 27/00* (2006.01)
*B64D 45/00* (2006.01)
*G08G 5/00* (2006.01)
*G01C 23/00* (2006.01)

(52) U.S. Cl.
CPC ....... G02B 27/0093 (2013.01); *G01C 23/005* (2013.01); *G02B 2027/0178* (2013.01); *G02B 2027/0183* (2013.01); *G08G 5/0047* (2013.01); *G09G 2380/12* (2013.01)

(58) Field of Classification Search
CPC ...... B64D 45/00; B64D 43/00; G01C 23/005; G09G 2380/12; G08G 5/0047
See application file for complete search history.

(56) References Cited

U.S. PATENT DOCUMENTS

| | | | | |
|---|---|---|---|---|
| 7,629,877 | B2* | 12/2009 | Lvovskiy | G02B 27/01 340/438 |
| 9,168,869 | B1* | 10/2015 | Kamal | B60R 1/00 |
| 2002/0048678 | A1* | 4/2002 | Hunia | B32B 27/06 428/412 |
| 2005/0237226 | A1* | 10/2005 | Judge | G01C 23/00 340/946 |
| 2006/0037038 | A1* | 2/2006 | Buck | G06F 3/013 725/9 |
| 2006/0056026 | A1* | 3/2006 | Kolosowsky | G02B 27/281 359/487.05 |
| 2008/0218434 | A1* | 9/2008 | Kelly | G02B 27/01 345/8 |
| 2009/0034087 | A1* | 2/2009 | Hung | G02B 5/0284 359/630 |
| 2009/0058126 | A1* | 3/2009 | Broude | B60J 3/04 296/97.2 |
| 2009/0201177 | A1* | 8/2009 | Soler | G01C 23/005 340/974 |
| 2009/0317773 | A1* | 12/2009 | Chapman | G09B 9/30 434/36 |
| 2010/0094501 | A1* | 4/2010 | Kwok | G02B 27/01 701/36 |
| 2011/0157667 | A1* | 6/2011 | Lacoste | G02B 27/2271 359/9 |
| 2012/0140125 | A1* | 6/2012 | Pepitone | G02B 27/0149 348/794 |
| 2012/0179369 | A1 | 7/2012 | Lapidot et al. | |
| 2013/0181887 | A1* | 7/2013 | Lee | G02B 27/01 345/7 |
| 2014/0111864 | A1* | 4/2014 | Margulis | G02B 27/0172 359/630 |
| 2014/0253579 | A1* | 9/2014 | Babaguchi | G02B 27/01 345/590 |
| 2014/0313189 | A1* | 10/2014 | Dominici | G06T 19/006 345/419 |
| 2014/0333510 | A1* | 11/2014 | Wischmeyer | B64D 43/00 345/8 |
| 2015/0092083 | A1* | 4/2015 | Lam | G02B 27/017 348/234 |
| 2015/0128037 | A1* | 5/2015 | Lee | G06F 9/454 715/703 |
| 2015/0151838 | A1* | 6/2015 | Kerns | B64D 43/00 345/633 |
| 2015/0191075 | A1* | 7/2015 | Fueller | G06T 19/006 345/633 |
| 2015/0232030 | A1* | 8/2015 | Bongwald | B60R 1/00 348/115 |
| 2016/0085301 | A1* | 3/2016 | Lopez | G06K 9/00604 345/156 |
| 2016/0109973 | A1* | 4/2016 | Kim | G06F 3/041 |
| 2016/0150201 | A1* | 5/2016 | Kilcher | H04N 9/3129 348/745 |
| 2016/0170487 | A1* | 6/2016 | Saisho | G01C 21/3635 345/156 |
| 2016/0187650 | A1* | 6/2016 | Mills | G02B 5/223 345/8 |
| 2016/0214467 | A1* | 7/2016 | El Idrissi | B60J 3/04 |
| 2016/0311323 | A1* | 10/2016 | Lee | B60K 37/06 |
| 2016/0377862 | A1* | 12/2016 | Zimmerman | G02B 27/0101 359/567 |
| 2017/0032571 | A1 | 2/2017 | Mohideen et al. | |
| 2017/0113641 | A1* | 4/2017 | Thieberger | B60R 1/00 |
| 2017/0113702 | A1* | 4/2017 | Thieberger-Navon | B60W 50/14 |
| 2017/0146797 | A1* | 5/2017 | Samuthirapandian | G02B 27/0101 |
| 2017/0187963 | A1* | 6/2017 | Lee | G06F 3/013 |
| 2017/0212398 | A1* | 7/2017 | Cao | H01L 21/77 |
| 2017/0214904 | A1* | 7/2017 | Wyatt | G08G 5/0021 |
| 2017/0269370 | A1* | 9/2017 | Sato | G09G 5/373 |
| 2017/0270899 | A1* | 9/2017 | Sato | G06T 11/60 |
| 2017/0280024 | A1* | 9/2017 | Murugesan | H04N 1/622 |
| 2017/0323615 | A1* | 11/2017 | Hazra | G02B 27/0172 |
| 2017/0343799 | A1* | 11/2017 | Ito | G02B 27/0093 |
| 2018/0011314 | A1* | 1/2018 | Quiroz de la Mora | G02B 27/0101 |
| 2018/0015810 | A1* | 1/2018 | Chelian | B60R 1/04 |
| 2018/0024359 | A1* | 1/2018 | Yoneyama | G09G 5/377 345/9 |
| 2018/0088323 | A1* | 3/2018 | Bao | G01C 21/365 |
| 2018/0089893 | A1* | 3/2018 | Kukis | G06F 3/015 |
| 2018/0101988 | A1* | 4/2018 | Murillo | G06T 19/006 |
| 2018/0106098 | A1* | 4/2018 | Unveren | H05B 33/0896 |
| 2018/0111451 | A1* | 4/2018 | Martens | B60J 3/04 |
| 2018/0154860 | A1* | 6/2018 | Thieberger | B60R 21/36 |
| 2018/0164114 | A1* | 6/2018 | Chiu | G01C 21/365 |
| 2018/0164115 | A1* | 6/2018 | Chiu | G01C 21/365 |
| 2018/0204365 | A1* | 7/2018 | Lee | G06K 9/00597 |
| 2018/0222490 | A1* | 8/2018 | Ishihara | B60W 50/14 |
| 2018/0259804 | A1* | 9/2018 | Bae | G06F 3/01 |
| 2018/0326999 | A1* | 11/2018 | Hershkovitz | G06K 9/00335 |
| 2018/0366090 | A1* | 12/2018 | Shatzki | G02B 27/00 |
| 2019/0137841 | A1* | 5/2019 | Koo | G02F 1/163 |

\* cited by examiner

DISPLAY SYSTEM AND METHOD FOR AN AIRCRAFT

CROSS-REFERENCES TO RELATED APPLICATIONS

This application claims the benefit of the French patent application No. 1756020 filed on Jun. 29, 2017, the entire disclosures of which are incorporated herein by way of reference.

BACKGROUND OF THE INVENTION

The invention relates to the display of information in an aircraft cockpit. Modern aircraft, in particular transport planes, generally comprise a system for displaying flight assistance information in their cockpit. Such a system, for example of the CDS (for Control and Display System) type controls the display of information on screens, referred to as head down displays, of the cockpit. Usually, these screens are provided for displaying primary flight information of the aircraft, navigation information, etc. In order to allow the user to see a display of information without being constrained to lower his/her head to look at the screens, some aircraft are now equipped with a head up display device, commonly referred to as a HUD, for Head Up Display, and/or of a device configured so as to be worn rigidly attached to the head of the user. Such a device is commonly referred to as a HMD, for Head Mounted Display. It is sometimes also referred to as a HWD, for Head Worn Display. It generally comprises a display unit rigidly mounted onto glasses or a helmet, in such a manner that the user can see information displayed on the display unit when they are wearing these glasses or this helmet. In the following part of the description, the term HMD denotes both a HMD device and a HWD device. Furthermore, the pilots of aircraft often dispose of a device of the EFB (for Electronic Flight Bag) type external to the avionics systems of the aircraft, allowing them to use software applications not certified by the aeronautics certification authorities. According to a first alternative, this device of the EFB type corresponds to a computer integrated into the aircraft, whose display is generally formed on a screen integrated into the cockpit. The integration of a screen into the cockpit is sometimes difficult because the space available in an aircraft cockpit for integrating a display screen is generally very limited. Moreover, the mass of the display screen leads to an increase in the mass of the aircraft. According to a second alternative, this device of the EFB type corresponds to a portable computer or to a tablet that the pilot can bring with him/her into the cockpit of the aircraft. According to a first variant, the device of the EFB type is then connected to a display screen integrated into the cockpit, which poses the same problems as those mentioned with reference to the first alternative. According to a second variant, the pilot uses directly a screen of the device of the EFB type. However, the screen of the device of the EFB type sometimes has a more reduced size than that of a screen in the cockpit, which limits the comfort of use, in particular for the manipulation of navigation maps. Moreover, the use of the device of the EFB type then requires the presence in the cockpit, near to the pilot, of a surface or of a support allowing this device of the EFB type to be placed or hung up. The integration of such a surface or such a support in the cockpit is sometimes difficult because the space available in a cockpit, near to the pilot, is generally very limited. There accordingly exists the need for a solution allowing an additional display to be integrated into the cockpit.

SUMMARY OF THE INVENTION

The present invention is notably aimed at providing a solution to this need. It relates to a display system for a cockpit of an aircraft comprising:
 a display device configured so as to be worn rigidly attached to the head of a user in the cockpit of the aircraft; and
 a display computer configured for controlling the display on the display device according to a first display mode in which the display comprises at least one piece of flight assistance information for the aircraft relating to a current situation of the aircraft.

The system is noteworthy in that it furthermore comprises:
 a masking device associated with a side window of the cockpit, the masking device being controllable between, on the one hand, a first state called transparent state in which it allows the user to see the environment outside of the aircraft through the side window and, on the other hand, a second state called opaque in which the masking device masks the view of the environment outside of the aircraft from the user through at least one predetermined masking surface of the side window; and
 a sensor for position and for orientation of the head of the user in the cockpit,
 and in that the display system comprises one mode of operation referred to as extended display mode, in which the display computer is configured for:
 acquiring from the sensor, position information and orientation information on the head of the user in the cockpit;
 determining a direction corresponding to the orientation of the head of the user as a function of the information on position and on orientation of the head of the user in the cockpit;
 determining whether the direction corresponding to the orientation of the head of the user has an intersection with a region of interest including an area referred to as display area included in the predetermined masking surface of the side window;
 when the direction corresponding to the orientation of the head of the user does not have an intersection with the region of interest, controlling the display on the display device according to the first display mode; and
 when the direction corresponding to the orientation of the head of the user has an intersection with the region of interest, controlling the opaque state of the masking device and controlling the display on the display device according to a second display mode in which the said display comprises a virtual display screen on the display area.

Thus, the user such as a pilot of the aircraft disposes of an additional display location on a side window of the aircraft. This additional display location is only enabled when, on the one hand, the user enables the extended display mode and, on the other hand, the user turns his/her head in such a manner as to look in the direction of the side window. This allows the user to conserve the visibility of the environment outside of the aircraft through the side window, when the extended display mode is not enabled. Moreover, this additional display location does not lead to an increase in mass of the aircraft. Furthermore, the dimensions of the display area corresponding to the additional display location are essentially limited by the dimensions of the side window. It is consequently possible to choose dimensions greater than those of the screen of a device of the EFB type, which allows the comfort of use to be enhanced.

According to particular embodiments which may be taken into account individually or in combination:

the display system furthermore comprises a device for enabling the extended display mode, and the display computer is configured for enabling or disabling the extended display mode according to the actions of the user on the device for enabling the extended display mode;

the display computer is configured for:

acquiring, from an avionics computer of the aircraft, information on the current flight phase of the aircraft; and when the information on the current flight phase of the aircraft corresponds to a predetermined flight phase, controlling the opaque state of the masking device when the extended display mode is enabled;

in the second display mode, the display computer is furthermore configured for:

determining a distance between a current position of the eyes of the user and the side window display area; and controlling the display of the said virtual display screen on the display device with a collimation distance substantially corresponding to the distance determined between the current position of the eyes of the user and the side window display area.

the display system is connected at its input to a device of the EFB type and, in the second display mode, the display on the virtual display screen corresponds to information coming from the device of the EFB type.

The invention also relates to a display method in a cockpit of an aircraft, the aircraft comprising a display system comprising:

a display device configured so as to be worn rigidly attached to the head of a user in the cockpit of the aircraft; and a display computer configured for controlling the display on the display device according to a first display mode in which the display comprises at least one piece of flight assistance information for the aircraft relating to a current situation of the aircraft.

The method is noteworthy in that the display system furthermore comprises:

a masking device associated with a side window of the cockpit, the masking device being controllable between, on the one hand, a first state called transparent in which it allows the user to see the environment outside of the aircraft through the side window and, on the other hand, a second state called opaque in which the masking device masks the view of the environment outside of the aircraft from the user through at least one predetermined masking surface of the side window; and a sensor for position and for orientation of the head of the user in the cockpit, in one embodiment referred to as extended display of the display system, the method comprises the following steps implemented by the display computer:

acquire from the sensor, position information and orientation information on the head of the user in the cockpit;

determine a direction corresponding to the orientation of the head of the user as a function of the information on position and on orientation of the head of the user in the cockpit;

determine whether the direction corresponding to the orientation of the head of the user has an intersection with a region of interest including an area referred to as display area included within the predetermined masking surface of the side window;

when the direction corresponding to the orientation of the head of the user does not have an intersection with the region of interest, control the display on the display device according to the first display mode; and when the direction corresponding to the orientation of the head of the user has an intersection with the region of interest, control the opaque state of the masking device and control the display on the display device according to a second display mode in which the said display comprises a virtual display screen on the display area.

The invention also relates to an aircraft comprising a display system such as the aforementioned system.

BRIEF DESCRIPTION OF THE DRAWINGS

The invention will be better understood upon reading the description that follows and upon examining the appended figures.

DETAILED DESCRIPTION OF THE PREFERRED EMBODIMENTS

Figure 1:
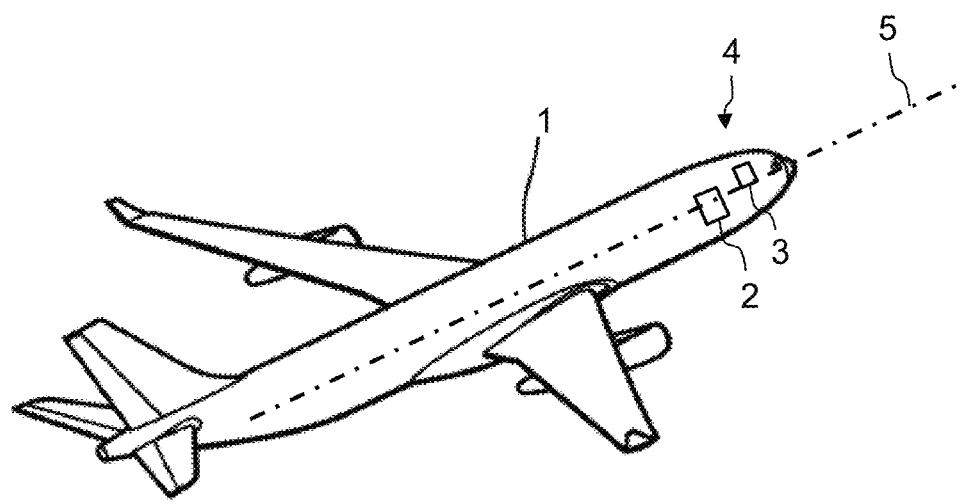
FIG. 1 illustrates, in a simplified manner, an aircraft comprising a cockpit.

The aircraft 1 shown in FIG. 1 comprises a cockpit 3 in a front part 4 of the said aircraft. It comprises a longitudinal axis 5, corresponding to a roll axis of the aircraft. This longitudinal axis is substantially horizontal when the aircraft is parked on the ground. The aircraft also comprises a yaw axis (not shown), substantially vertical when the aircraft is parked on the ground. By convention, in the following part of the description, the term horizontal denotes a straight line or a plane that is substantially horizontal when the aircraft is parked on the ground, such that this straight line or this plane is perpendicular to the yaw axis of the aircraft. In a similar manner, the term vertical denotes a straight line or a plane that is substantially vertical when the aircraft is parked on the ground, such that this straight line or this plane is parallel to (or contains) the yaw axis of the aircraft.

Figure 2:
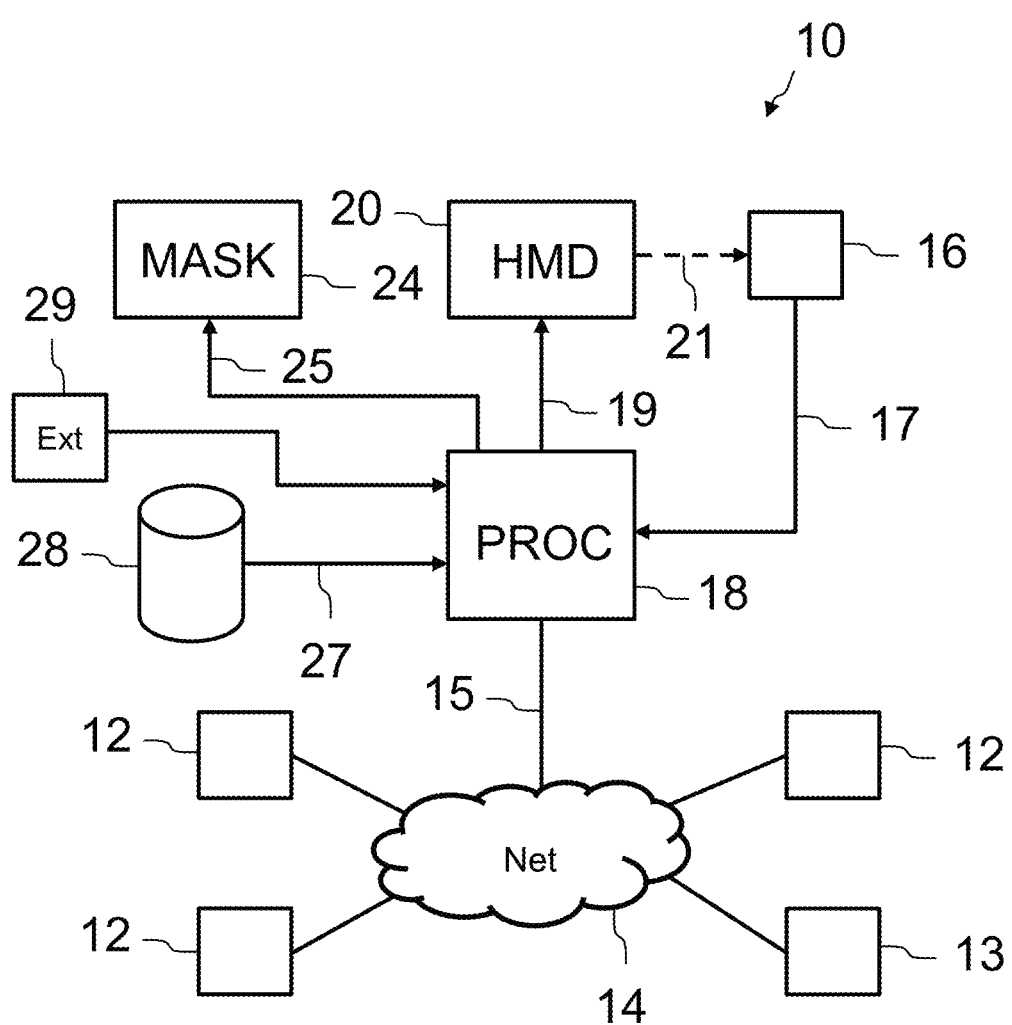
FIG. 2 illustrates schematically one embodiment, according to the invention, of a display system for a cockpit of an aircraft.

The display system 10 shown in FIG. 2 comprises a display computer 18 comprising a processing unit (labelled PROC in the figure). This processing unit may notably correspond to a processor or a microprocessor of the display computer. According to various embodiments, the display computer 18 is a common display computer controlling several display devices of the aircraft or else a computer dedicated to the display system 10. In one particular embodiment, this computer corresponds to a computer of the IMA (for Integrated Modular Avionics) type also supporting functions other than the display. The display system 10 furthermore comprises a display device 20 configured so as to be worn rigidly attached to the head of a user in the cockpit of the aircraft. This display device corresponds to an HMD (or HWD) display device such as previously mentioned. It is connected to the display computer 18 via a link 19. The display computer 18 is connected to at least one avionics computer 12 of the aircraft. In the particular example shown in FIG. 2, the display computer is connected to several avionics computers 12 via a link 15 of a communications network 14 (labelled "Net" in the figure) to which these avionics computers are also connected. The avionics computers 12 are for example situated in an avionics rack 2 of the aircraft. The display system 10 also comprises at least one masking device 24 (labelled "Mask" in the figure) associated with a side window 6a, 6b of the cockpit 3. This masking device is connected to the display computer 18 via a link 25. The masking device 24 is able to be controlled, by means of the link 25, between a first state called transparent in which it allows a user situated in the cockpit to see the environment outside of the aircraft through the side window of the cockpit, and at least a second state called opaque in which this masking device masks the view of the environment outside of the aircraft from the user through at least one predetermined masking surface of the side window. In one particular embodiment, the masking device 24 corresponds to an electrochromatic or electro-optic film applied onto the said predetermined masking surface of the side window. It is controllable between the first transparent state and the second opaque state by application of an electrical voltage between two terminals of the said electrochromatic or electro-optic film. For example, the absence of application of an electrical voltage (electrical voltage of substantially zero value) corresponds to the transparent state of the masking device, on the one hand, and an electrical voltage with a non-zero value (for example 10 volts) corresponds to the opaque state, on the other. According to a first alternative, the voltage is directly applied to the terminals of the electrochromatic or electro-optic film by means of the link 25. According to a second alternative, a local controller is situated near to the side window. This local controller is configured for controlling the application of a suitable voltage to the terminals of the electrochromatic or electro-optic film according to the instructions received from the display computer 18 via the link 25. The display system 10 furthermore comprises a sensor 16 for orientation and for position of the head of the user. This sensor 16 is connected to the display computer 18 via a link 17. In one particular embodiment, the sensor 16 is installed rigidly attached to the display device 20, as symbolized by the dashed arrow 21. It then corresponds, for example, to an assembly of inertial sensors integrated into the display device 20. In another particular embodiment, the sensor 16 is installed rigidly attached to the cockpit 3 of the aircraft. It then corresponds, for example, to a camera disposed in such a manner as to automatically monitor the head of the user of the display device 20. Without straying from the scope of the invention, the sensor 16 may correspond to a group of sensors, for example an orientation sensor for the head of the user and a position sensor for the head of the user. The display system also comprises a device 29 (labelled "Ext" in the figure) for enabling one mode of operation referred to as extended display. This device corresponds, for example, to a button in the cockpit of the aircraft or to a man-machine interface in the cockpit, comprising a display screen together with a keyboard and/or a point-and-click device of the trackball or mouse type. This device for enabling the extended display mode is configured for transmitting information to the display computer 18 depending on the actions of the user on the said device for enabling the extended display mode. The display computer 18 is configured for enabling or disabling the extended display mode depending on the said information.

Figure 4:
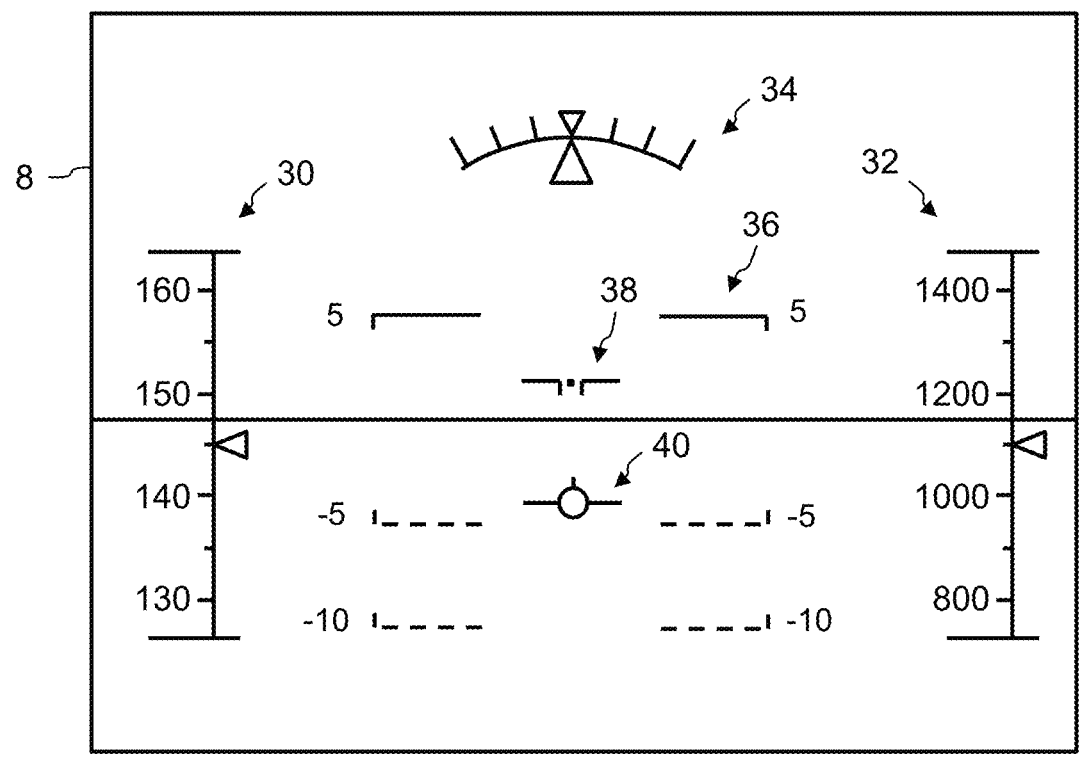
FIG. 4 illustrates one example of a usual display on an HMD display device.

In operation, when the extended display mode is not enabled, the display computer 18 controls, on the one hand, the transparent state of the masking device 24 and controls, on the other hand, the display on the display device HMD 20, in a usual manner, according to a first display mode in which the display comprises at least one piece of flight assistance information for the aircraft relating to a current situation of the aircraft. This flight assistance information comes from the at least one avionics computer 12 or is determined by the display computer 18 as a function of information received from the at least one avionics computer 12. One example of the display of a set of flight assistance information on the display device 20, according to this first display mode, is shown in FIG. 4. The display on a display unit 8 of the display device 20 comprises for example an aircraft reference symbol 38, a symbol 40 for speed vector of the aircraft and an attitude scale 36 for the aircraft, displayed in a manner that conforms to the environment of the aircraft. The display also comprises an altitude scale 32, a speed scale 30 and a roll scale 34 for the aircraft.

Figure 5:
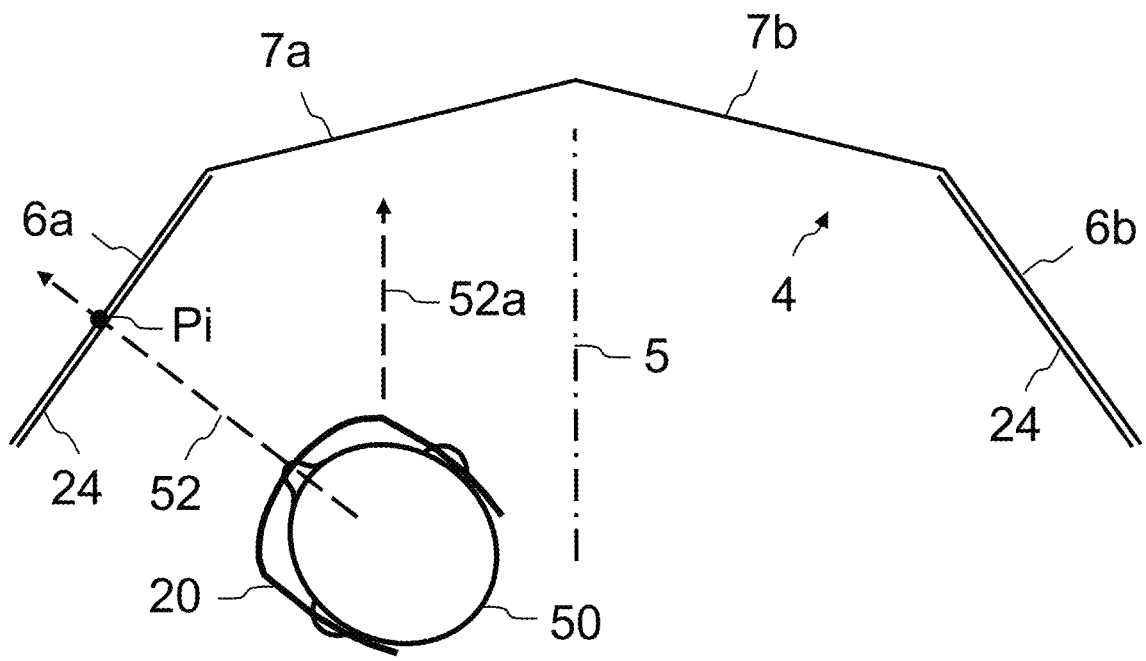
FIG. 5 illustrates, in a top view, a cockpit of an aircraft equipped with a display system according to one embodiment of the invention.

In the example shown in FIG. 5, the cockpit of the aircraft comprises a windscreen 4 comprising two front windows 7a and 7b, a left-side window 6a and a right-side window 6b. The user, for example a pilot of the aircraft, is seated in the cockpit in such a manner that his head 50 is situated near to the left-side window 6a. The masking device 24 is associated with the left-side window 6a. When the user wishes to dispose of an additional display location on the left-side window 6a, for example for the display of a device of the EFB type, it controls the enabling of the extended display mode by means of the device 29. The display computer 18 receives the command for enabling the extended display mode and it then implements the following steps in a repeated fashion:

acquire, from the sensor 16, position information and orientation information on the head of the user in the cockpit;

determine a direction 52, as illustrated in FIG. 5, corresponding to the orientation of the head of the user, as a function of the information on position and on orientation of the head of the user in the cockpit;

determine whether the direction 52 corresponding to the orientation of the head of the user has an intersection with a region of interest Zi including an area referred to as display area Zd included in the predetermined masking surface of the side window 6a by the masking device 24;

when the direction 52 corresponding to the orientation of the head of the user does not have an intersection with the region of interest, control the display on the display device according to the first display mode, such as illustrated by way of example in FIG. 4. Advantageously, although not necessarily, the display computer then also controls the transparent mode of the masking device 24; and when the direction 52 corresponding to the orientation of the head of the user has an intersection, at a point Pi, with the region of interest, control the opaque state of the masking device 24 and control the display on the display device 20 according to a second display mode in which the said display comprises a virtual display screen on the display area Zd.

Figure 6:
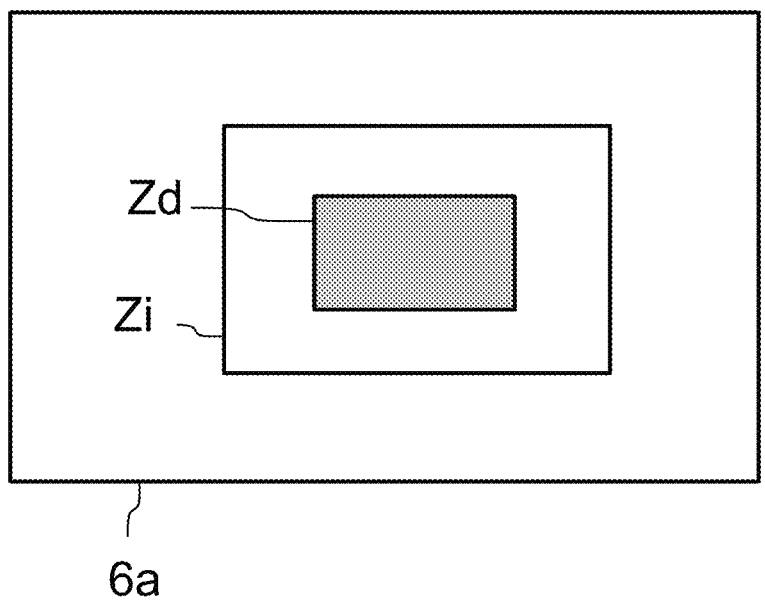
FIGS. 6 and 7 illustrate a display, on an HMD display device, according to one embodiment of the invention.
Figure 7:
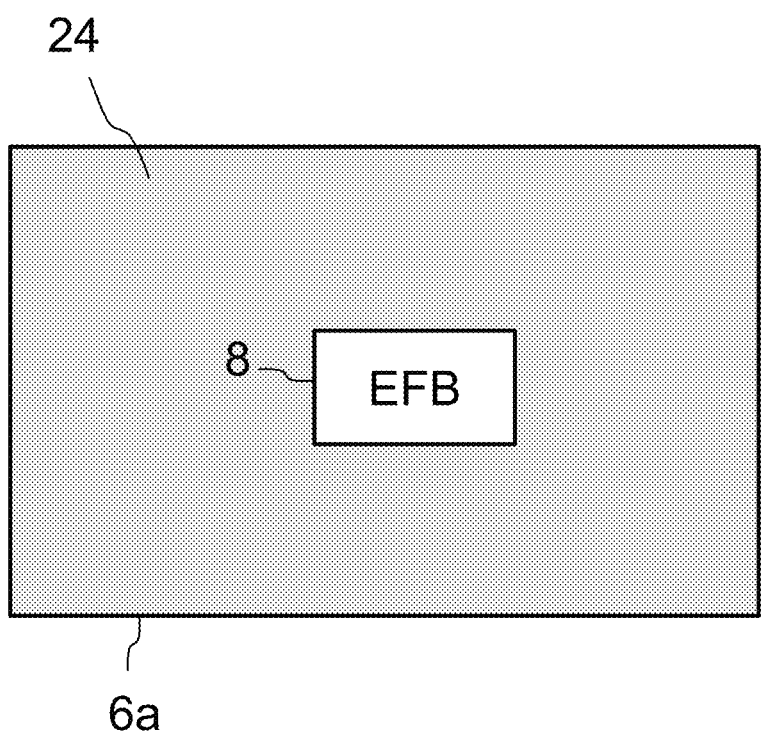

Thus, when the extended display mode is enabled and the user is looking towards the front of the aircraft, for example through the window 7a of the windscreen as illustrated in FIG. 5, with a direction 52a of the head of the user not having any intersection with the region of interest of the side window 6a, the display computer controls the display on the display device 20 according to the first display mode, such as illustrated for example in FIG. 4. When the user turns his/her head 50 to the left, the direction 52 corresponding to the orientation of the head of the user then makes an intersection with the left-side window 6a at a point of intersection Pi on the region of interest Zi shown in FIG. 6. The determination of the point of intersection Pi implements normal geometrical calculations which are not further detailed here since they are available to those skilled in the art. The region of interest Zi is a predetermined region chosen so as to encompass a display area Zd. According to a first example, the region of interest Zi is defined taking into account a right lateral margin and a left lateral margin with respect to the display area Zd, together with a top vertical margin and a bottom vertical margin with respect to the display area Zd. The display area Zd corresponds to an area of the side window 6a provided for the display of the virtual display screen. Advantageously, the lateral and vertical margins between the display area Zd and the region of interest Zi are predefined in such a manner that the point of intersection Pi is situated within the region of interest Zi when the display area Zd is situated at least in part within the field of vision of the user visible through the display device 20 (which corresponds to a situation in which the virtual display screen is able to be displayed, at least in part, by the display device 20, on the display area Zd). According to a second example, the region of interest Zi corresponds to the whole of the surface area of the side window 6a. Thus, the direction 52 corresponding to the orientation of the head of the user has an intersection, at a point Pi, with the region of interest Zi whenever the said direction 52 corresponding to the orientation of the head of the user makes an intersection with the side window 6a.

Advantageously, the display system 10 comprises a memory comprising information on position of the side window 6a in a reference frame of the cockpit. According to a first alternative, this memory is a memory of the display computer 18. According to a second alternative, this memory corresponds to a memory or to a database 28 external to the display computer 18 and connected to the display computer 18 via a link 27, such as shown in FIG. 2. In a first embodiment, this memory contains position information on the region of interest Zi and/or on the display area Zd. When the memory does not contain position information on the display area Zd, the said lateral and vertical margins are predefined in the display computer 18 and the latter determines the region of interest Zi as a function of the display area Zd and of the said margins. In a second embodiment, the memory contains information on position of the side window 6a. The characteristics (in particular the dimensions) of the display area Zd and of the region of interest Zi are predetermined in the display computer 18. As a function of the position of the side window and of the said characteristics, the display computer determines the positions of the display area Zd and of the region of interest Zi. In one particular exemplary embodiment, the display computer determines these positions by considering the display area Zd as being centered on the side window 6a.

The display computer 18, which has determined the direction 52 corresponding to the orientation of the head of the user, together with the position of the region of interest Zi, can thus determine whether the direction 52 corresponding to the orientation of the head of the user has an intersection with the region of interest Zi.

Advantageously, in the second display mode, the display computer is furthermore configured for determining a distance between a current position of the eyes of the user and the display area Zd of the side window. According to a first alternative, the display computer 18 calculates this distance as a function, on the one hand, of the position of the head of the user in the cockpit and, on the other hand, of the position of the display area Zd. According to a second alternative, the display system 10 furthermore comprises a distance sensor associated with the display device 20. This distance sensor corresponds for example to a sensor using waves such as ultrasound waves or electromagnetic waves, in particular of the infrared type. The display computer 18 carries out the acquisition of a measurement supplied by the said sensor and it determines the distance between the current position of the eyes of the user and the display area Zd as a function of the measurement supplied by the sensor. According to a third alternative, the display computer uses a predetermined value of distance as value of the distance between the current position of the eyes of the user and the display area Zd of the side window. This value of distance is for example predetermined as a function of a theoretical position of the head 50 of the user in the cockpit 3 of the aircraft. The display computer 18 controls the display of the virtual display screen on the display device 20 with a collimation distance substantially corresponding to the distance determined between the current position of the eyes of the user and the side window display area. This allows the user to see the virtual display screen as if it were a real screen disposed on the side window 6a.

In the particular case where the virtual display screen is used for the display of a device of the EFB type, the display system 10 is connected at the input to this device of the EFB type. For example, the display computer 18 comprises a video input connected to a video output of the device of the EFB type. In the second display mode, the display computer 18 controls the display, on the virtual display screen, in such a manner that this display corresponds to information coming from the video output of the device of the EFB type.

In one particular embodiment, the display computer 18 is furthermore configured for acquiring, from an avionics computer of the aircraft, information on the current flight phase of the aircraft. When the information on the current flight phase of the aircraft corresponds to a predetermined flight phase, the display computer 18 controls the opaque state of the masking device when the extended display mode is enabled. The predetermined flight phase corresponds for example to a cruising flight phase. In such a flight phase, a pilot has less need to see the environment outside of the aircraft through the side window 6a than during a taxiing phase or of a landing phase. As a consequence, when the user enables the extended display mode, it is possible to control the opaque state of the masking device 24 associated with the side window 6a with no detriment to the user. This particular embodiment has the advantage of avoiding successive switching operations between the transparent state and the opaque state of the masking device 24 according to the orientation of the head of the user.

The various aforementioned embodiments have been described with reference to a masking device 24 associated with the left-side window 6a of the cockpit, notably when the user is a pilot of the aircraft whose head is situated near to the said left-side window 6a. The invention is similarly applicable to a masking device 24 associated with a right-side window 6b of the cockpit, notably when the user is a copilot of the aircraft whose head is situated near to the said right-side window 6b.

Figure 3A:
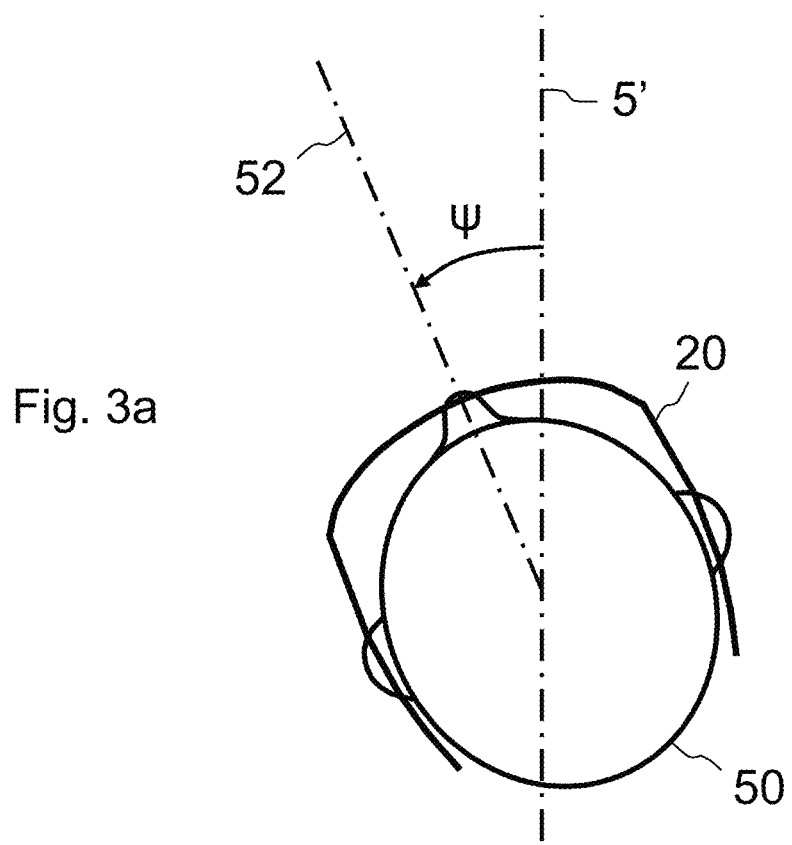
FIGS. 3a, 3b and 3c illustrate the orientation of the head of a user of the display system, respectively in a top view, in a side view and in a rear view.
Figure 3B:
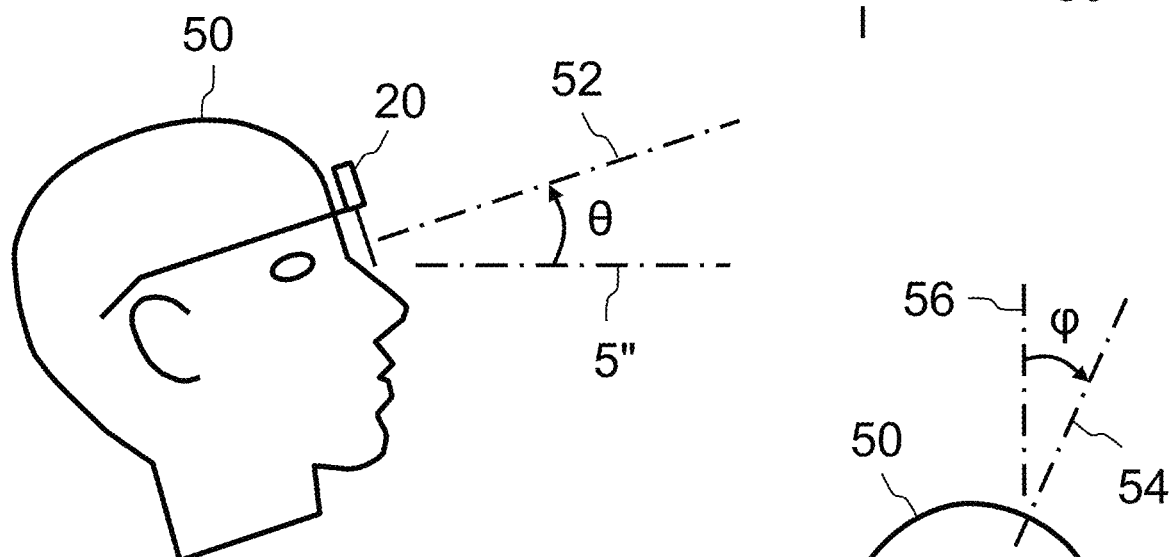
Figure 3C:
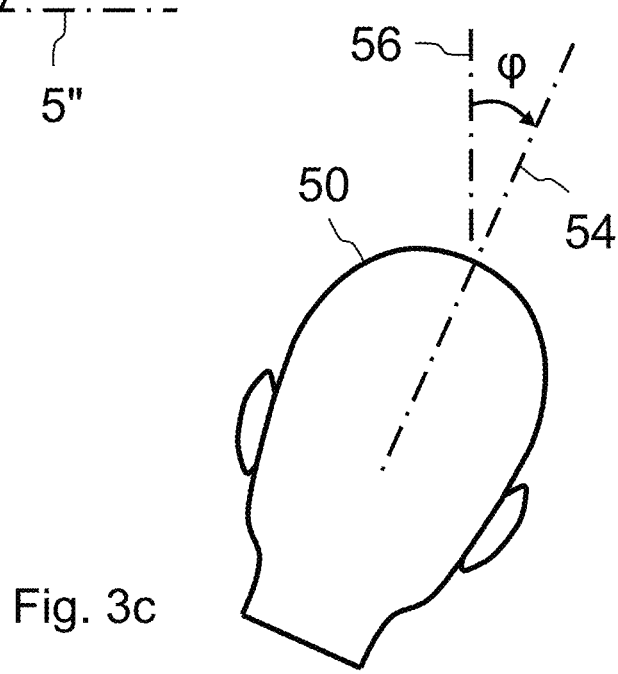

In one advantageous embodiment, the information on orientation of the head of the user corresponds to at least one angle from amongst a set of angles, such as illustrated in FIGS. 3a, 3b and 3c. In these figures, the orientation of the head 50 of the user is represented by a straight line 52. In one exemplary embodiment, this straight line 52 corresponds to a theoretical direction of the gaze of the user when he/she is looking towards the front without turning his/her eyes either to the right or to the left and without raising or lowering his/her eyes. Other definitions of the orientation of the head of the user are however possible without straying from the scope of the invention. In the said advantageous embodiment, the information on orientation of the head of the user corresponds to at least one angle from amongst a yaw angle $\psi$, a pitch angle $\theta$ and a roll angle $\varphi$ respectively illustrated in FIGS. 3a, 3b and 3c. These angles are defined in a reference frame linked to the aircraft. Thus, the yaw angle $\psi$ is an angle, defined in a projection onto a horizontal plane, between a straight line 5' parallel to the longitudinal axis 5 of the aircraft and the straight line 52 representing the orientation of the head of the user. The pitch angle $\theta$ is an angle, defined in a projection onto a vertical plane parallel to the longitudinal axis 5 of the aircraft, between a straight line 5" parallel to the longitudinal axis 5 of the aircraft and the straight line 52 representing the orientation of the head of the user. The roll angle $\varphi$, on the other hand, is an angle defined in a projection onto a vertical plane perpendicular to the longitudinal axis 5 of the aircraft, between a vertical straight line 56 and a yaw axis 54 of the head of the user. The orientation information on the head of the user acquired by the display computer 18 corresponds to at least one of the angles $\psi$, $\theta$ and $\varphi$.

Advantageously again, the position information on the head of the user corresponds to Cartesian coordinates, in an orthonormal reference frame, of a point situated at the center of a segment connecting both eyes of the user. In particular, a first axis of the orthonormal reference frame is parallel to the longitudinal axis 5, a second axis of the orthonormal reference frame is vertical and a third axis of the orthonormal reference frame is horizontal and perpendicular to the first two axes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system for a cockpit of an aircraft, the said display system comprising:
   a display device configured to be worn rigidly attached to a user's head in the cockpit of the aircraft; and
   a display computer configured for controlling the display on the display device according to a first display mode in which the display comprises at least one piece of flight assistance information for the aircraft relating to a current situation of the aircraft,
   a masking device associated with a side window of the cockpit, the masking device being controllable between a first state called transparent in which the masking device allows the user to see an environment outside of the aircraft through the side window and a second state called opaque in which the masking device masks a view of the environment outside of the aircraft from the user through at least one predetermined masking surface of the side window;
   a device for enabling an extended display mode, wherein the display computer is further configured to enable or disable the extended display mode according to actions of the user on the device for enabling the extended display mode; and,
   a sensor for position and for orientation of the head of the user in the cockpit, and
   wherein in extended display mode the display computer is configured for:
   acquiring from the sensor, position information and orientation information on the head of the user in the cockpit;
   determining a direction corresponding to the orientation of the head of the user as a function of the information on position and on orientation of the head of the user in the cockpit;
   determining whether the direction corresponding to the orientation of the head of the user has an intersection with a region of interest including an area referred to as display area included within the predetermined masking surface of the side window;
   when the direction corresponding to the orientation of the head of the user does not have an intersection with the region of interest, controlling the display on the display device according to the first display mode; and
   only when the direction corresponding to the orientation of the head of the user has an intersection with the region of interest, and when the extended display mode has been enabled, controlling the masking device to be in the second state and controlling the display on the display device according to a second display mode in which the said display comprises a virtual display screen on the display area.

2. The system according to claim 1, the display computer being configured for:
   acquiring, from an avionics computer of the aircraft, information on a current flight phase of the aircraft; and
   when the information on the current flight phase of the aircraft corresponds to a predetermined flight phase, controlling the opaque state of the masking device only when the extended display mode is enabled and when the direction corresponding to the orientation of the head of the user has an intersection with the region of interest.

3. The system according to claim 1, wherein, in the second display mode, the display computer is furthermore configured for:
   determining a distance between a current position of eyes of the user and the display area of the side window; and controlling the display of the said virtual display screen on the display device with a collimation distance substantially corresponding to the distance determined between the current position of the eyes of the user and the side window display area.

4. The system according to claim 1, further comprising a connection at an input to a device of an EFB type and, in the second display mode, the display on the virtual display screen corresponding to information coming from the device of the EFB type.

5. A display method for a cockpit of an aircraft, the aircraft comprising a display system comprising:
- a display device configured so as to be worn rigidly attached to a user's head in the cockpit of the aircraft; and
- a display computer configured for controlling the display on the display device according to a first display mode in which the display comprises at least one piece of flight assistance information for the aircraft relating to a current situation of the aircraft,
- a masking device associated with a side window of the cockpit, the masking device being controllable between a first state called transparent in which the masking device allows the user to see an environment outside of the aircraft through the side window and a second state called opaque in which the masking device masks a view of the environment outside of the aircraft from the user through at least one predetermined masking surface of the side window;
- a device for enabling an extended display mode, wherein the display computer is further configured to enable or disable the extended display mode according to actions of the user on the device for enabling the extended display mode; and
- a sensor for position and for orientation of the head of the user in the cockpit,
- wherein in extended display mode of the display system, the method comprises the following steps implemented by the display computer:
  - acquiring, from the sensor, position information and orientation information on the head of the user in the cockpit;
  - determining a direction corresponding to the orientation of the head of the user as a function of the information on position and on orientation of the head of the user in the cockpit;
  - determining whether the direction corresponding to the orientation of the head of the user has an intersection with a region of interest including an area referred to as display area included in the predetermined masking surface of the side window;
  - when the direction corresponding to the orientation of the head of the user does not have an intersection with the region of interest, controlling the display on the display device according to the first display mode; and
  - only when the direction corresponding to the orientation of the head of the user has an intersection with the region of interest, and when the extended display mode has been enabled, controlling the masking device to be in the second state and controlling the display on the display device according to a second display mode in which the said display comprises a virtual display screen on the display area.

6. An aircraft comprising a display system according to claim 1.

7. The display method of claim 5, wherein the process further comprises:
- acquiring, from an avionics computer of the aircraft, information on a current flight phase of the aircraft; and
- when the information on the current flight phase of the aircraft corresponds to a predetermined flight phase, controlling the opaque state of the masking device only when the extended display mode is enabled and when the direction corresponding to the orientation of the head of the user has an intersection with the region of interest.

* * * * *